United States

Brown

[11] 3,902,786
[45] Sept. 2, 1975

[54] OPTICAL ACCESS COUPLER FOR FIBER BUNDLES
[75] Inventor: Lorin W. Brown, Temple Hills, Md.
[73] Assignee: The United States of America as represented by the Secretary of the Navy, Washington, D.C.
[22] Filed: Nov. 29, 1974
[21] Appl. No.: 528,519

[52] U.S. Cl. ............................ 350/96 C; 350/96 B
[51] Int. Cl.² .......................................... G02B 5/16
[58] Field of Search ............... 350/96 R, 96 C, 96 B

[56] References Cited
UNITED STATES PATENTS
2,881,976 4/1959 Greanias .............................. 350/96
3,392,623 7/1968 Walker et al. ........................ 350/96

*Primary Examiner*—John Kominski
*Attorney, Agent, or Firm*—R. S. Sciascia; Arthur L. Branning; M. L. Crane

[57] ABSTRACT

This optical access coupler is used to extract a fraction of the light carried by a multimode optical fiber bundle data transmission line and to inject light signals onto the transmission line in such a way as to distribute the input light nearly uniformly over the fibers of the fiber bundle transmission line. A portion of the light on the transmission line is coupled out while a different portion continues straight through the access coupler.

4 Claims, 4 Drawing Figures

OPTICAL ACCESS COUPLER FOR FIBER BUNDLES

BACKGROUND OF THE INVENTION

This invention is directed to an optical radiation coupler and more particularly to an optical radiation coupler by which a fraction of optical radiation carried by a multimode optical fiber bundle transmission line may be coupled off as well as other signals injected onto the transmission line.

Fiber bundles have been used for a number of years in conjunction with a light source and photo detectors to transmit data from one place to another. Recently, consideration has been given to the construction of multiterminal optical data transmission systems where a number of terminals could "talk" to each other over the same fiber bundle system. One configuration uses a main fiber bundle "buss" to carry the data with multiple access to this main data transmission line. Such an approach needs optical "T" connectors which are also called optical access couplers. A number of different designs have already been proposed which provide access by the use of bundle fractionation or mirrors set at 45° to the axis of the main transmission line. The designs which use bundle fractionation are hard to fabricate whereas the designs which use mirrors either do not preserve bundle cross sectional area or experience losses for rays which make a large angle with the main axis. Other designs use bent dielectric rods optically bonded to a throughput rod, however, the input from this design is also partially taken off at the same terminal (i.e., the connector talks to itself).

SUMMARY OF THE INVENTION

This invention permits one to couple radiation into and out of a main transmission line by use of a plurality of optically transparent dielectric rods joined together. Radiation from one source may be added to the main radiation transmission and radiation may be removed from the transmission line. The length of the coupler element must be sufficient to permit even distribution of the radiation over the bundle face of the joining optic bundle or detector if used directly. The number of auxiliary lines joined to the main rod depends upon the desired additions of on and off coupling rods.

DETAILED DESCRIPTION

Figure 1:
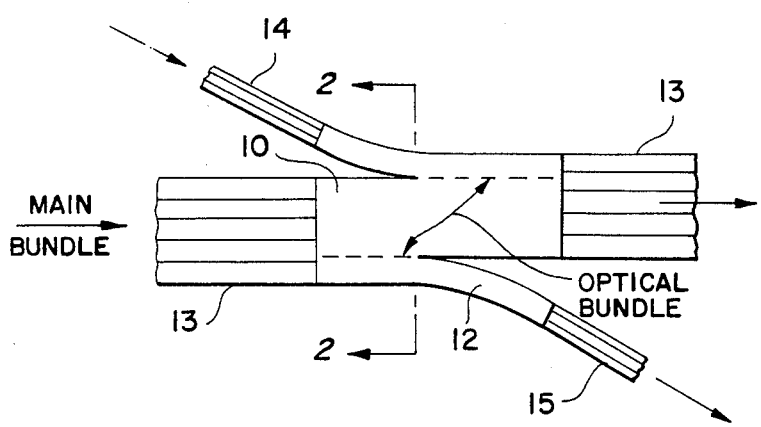
FIG. 1 illustrates a side view of the coupler connected with fiber optic bundles.
Figure 2:
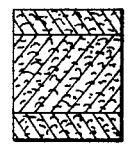
FIG. 2 illustrates a cross sectional view of FIG. 1 along lines 2—2 of FIG. 1.

Now referring to the drawing, there is illustrated a coupler for coupling radiation into and out of a main radiation transmission line. FIG. 1 illustrates a rectangular optically transparent dielectric main rod 10 having an index of refraction which is selected to match the optical fibers numerical aperture in the most optimal manner. Auxiliary optically transparent dielectric rods 11 and 12 are bonded to the main rod on directly opposite sides thereof in optical alignment therewith and have the same index of refraction. As shown, rod 11 is secured with one end in alignment with one end of main rod 10 and rod 12 is secured with one end in alignment with the opposite end of rod 10 such that their free ends are facing in opposite directions. The rods 11 and 12 are joined to rod 10 over a portion of their length only and their free end is bent in a direction away from rod 10 so that auxiliary fiber bundles or optical instruments may be connected thereto. The medium surrounding the dielectric rods, 10, 11 and 12 must have a lower index of refraction than that of the dielectric rods so that radiation will be contained within the rods depending upon the critical angle of reflection within the rod as is well known in the prior art. Of course, the dielectric rods may be clad with a material of lower index of refraction without any further concern about the surrounding medium.

In the event the rods are provided with a cladding on the outer surface, the cladding must be removed along those surface areas in which the rods are bonded together. Since optical radiation is transmitted between the rods, the rods must be of a material that has the same index of refraction. Further, the epoxy or bonding material must have the same index of refraction as that of the dielectric rods.

In operation, the connector is placed between two portions 13 of a main fiber optic bundle transmission line. The cross sectional area of the ends of the main rod 10 and the end of one of the other rods of the coupler (one at each end of rod 10) must be equal to the cross sectional area of the main transmission line portions. One main transmission line end portion will be optically aligned with rod 10 and the joined end of rod 11 and the other main transmission line end will be optically aligned with the end of rod 10 and the joined end of rod 12. Therefore radiation transmitted over the main transmission line 13 in the direction of the arrow will be transmitted into the joined end of rod 10 and the end of rod 12 and be transmitted along rods 10 and 12. The radiation portion transmitted along rod 10 will be transmitted onto the end of the other portion of the main transmission line and the radiation portion transmitted through rod 12 will be transmitted from rod 12 to an auxiliary fiber optic bundle connected thereto or into a suitable optical detector connected directly thereto. To the portion of radiation transmitted through the main rod 10, radiation may be added by transmission of radiation through rod 11 which is added to the portion of radiation transmitted through the main rod 10 to the outlet end. Thus, radiation may be taken off the main transmitted radiation and also added to the main transmitted radiation without any interruption. The length of the rods are such that the radiation entering the rods is evenly distributed over the transmission bundle.

In the coupler shown in FIG. 1, the radiation may be transmitted in the opposite direction through the main rod by changing the rods 11 and 12 respectively to output and input lines. Thus, the radiation will be transmitted in the opposite directions from that described above.

Figure 3:
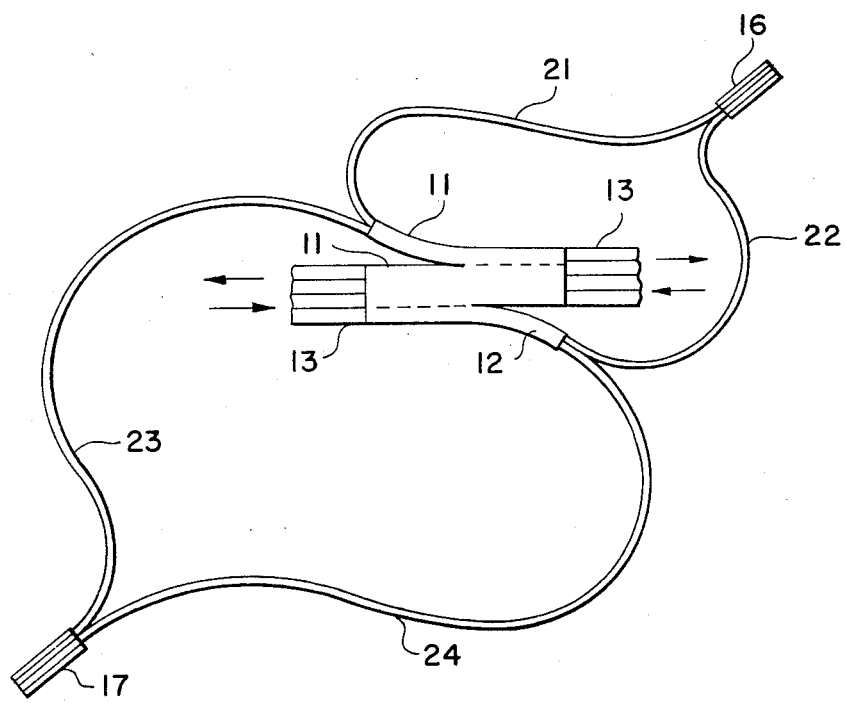
FIG. 3 illustrates the coupler of FIG. 1 with different input-output connected optical fiber bundles.

FIG. 3 illustrates a coupler such as shown in FIG. 1. As shown, the auxiliary fiber optic bundles 16, 17 are bifurcated or separated into separate pairs of fiber optic bundles 21–22 and 23–24 connected to the ends of each of the rods 11 and 12. Thus, radiation may be directed through either rod 11 or 12 in either direction depending on the direction in which the radiation is directed through the main rod 10. More than two transmission lines may be connected to the ends of rods 11 and 12. Also the ends of rods 11 and 12 may be connected directly to an optical detector or any other desired optical device.

In the arrangement of the main coupler rod and the attached rods, all of the radiation will end up in one rod 11 or 12 and the main rod without any being transmitted into the other rod 11 or 12 depending upon the direction of flow of the radiation in the main coupler rod.

Figure 4:
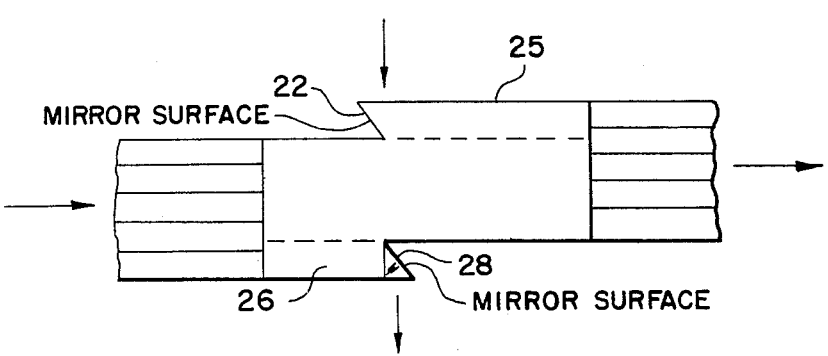
FIG. 4 is a modification making use of mirrors for input and output coupling of radiation.

FIG. 4 illustrates a coupler in which the auxiliary coupler rods 25, 26 extend only the length of their bond to the main rod. The ends of rods 25 and 26 are cut on a 45° angle and are provided with mirrored ends 27 and 28 which are arranged to reflect radiation out of the rod or into the rod depending upon the direction of the radiation within the main rod, as set forth above. Radiation entering the mirrored end of either rod will be reflected along the length of the auxiliary rod and into the main rod and onto the end of the fiber optic bundle transmission line connected to the main rod of the coupler. In order to reduce losses for high angle rays of radiation, the mirrored end of the auxiliary rods may have a higher index of refraction than the remainder of the rods.

In any of the couplers shown, fiber optic bundles may be optically connected to the rods for input and output paths or sources of radiation, detectors or other optical elements may be directly connected to abut the ends of the input and output rods.

The coupler set forth by this invention is easy to fabricate and will provide low loss input and output access to a fiber optic bundle transmission line. All the radiation from the input rod will end up on the transmission line without any passing on to the output auxiliary rod. The main dielectric rod serves as a scrambler or integrator to ensure an even distribution of the radiation over the connected bundle face.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical coupler for extracting a fraction of transmitted radiation while adding radiation to said transmitted radiation, which comprises:

a main optically transparent dielectric rod of sufficient length to evenly distribute radiation over its output end;

at least one input auxiliary rod bonded onto said main dielectric rod on one side over a portion of its surface in optical relationship thereto with the connected end in alignment with one end of said main rod;

at least one output auxiliary rod bonded onto said main dielectric rod or one side thereof opposite from said input auxiliary bundle in optical relationship with said main bundle with the end connected thereto at the end of said main rod opposite from the end connection of said input auxiliary rod;

whereby a portion of radiation transmitted through said main rod will emerge through said outlet rod and radiation added through said inlet rod will be added to said radiation transmitted through said main rod.

2. An optical coupler as claimed in claim 1; which includes, bifurcated optical fiber bundles connected with each of said input and output rods.

3. An optical coupler as claimed in claim 1; in which, said input and output auxiliary bundles have a length of only a portion of the length of said main rod, said input and output rods each having one end cut at a 45° angle and mirrored to reflect radiation from or into said main rod along the length thereof.

4. An optical coupler as claimed in claim 3; wherein said mirrored ends of said input and output rods have a higher index of refraction than the remainder of said rod.

* * * * *